United States Patent [19]

Iwata et al.

[11] Patent Number: 4,918,636

[45] Date of Patent: Apr. 17, 1990

[54] CIRCUIT FOR COMPARING A PLURALITY OF BINARY INPUTS

[75] Inventors: Jun Iwata; Takeshi Nishikawa, both of Tokyo; Toshihiko Nakamura, Yamanashi, all of Japan

[73] Assignee: NEC Corporation, Tokyo, Japan

[21] Appl. No.: 289,268

[22] Filed: Dec. 23, 1988

[30] Foreign Application Priority Data

Dec. 24, 1987 [JP] Japan ................................ 62-325201
Dec. 24, 1987 [JP] Japan ................................ 62-325202

[51] Int. Cl.⁴ ............................................... G06F 7/02
[52] U.S. Cl. .............................. 364/715.06; 340/146.2
[58] Field of Search ................... 364/715.06, 748, 769; 340/146.2

[56] References Cited

U.S. PATENT DOCUMENTS

| | | | |
|---|---|---|---|
| 3,731,765 | 5/1973 | Robaszkiewicz | 364/715.06 X |
| 3,825,895 | 7/1974 | Larsen et al. | 340/146.2 |
| 3,845,465 | 10/1974 | Hosick et al. | 340/146.2 |
| 3,955,177 | 5/1976 | Miller | 340/146.2 |
| 4,255,740 | 3/1981 | Ferrie | 340/146.2 |
| 4,539,549 | 9/1985 | Hong et al. | 364/715.06 |
| 4,695,971 | 9/1987 | Reimann | 364/769 |
| 4,734,876 | 3/1988 | Williams | 364/715.06 |
| 4,760,374 | 7/1988 | Moller | 340/146.2 |

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

A circuit for comparing a plurality of binary numbers according to this invention includes a circuit for receiving M ($M \geq 3$) binary numbers, and circuitry for generating and outputting a signal representing which of the binary number is maximum or minimum.

7 Claims, 5 Drawing Sheets

| RELATION BETWEEN A AND B (P0,Q0) | RELATION BETWEEN B AND C (P1,Q1) | RELATION BETWEEN C AND A (P2,Q2) | MAXIMUM (XA,XB,XC) | MINIMUM (NA,NB,NC) |
|---|---|---|---|---|
| A=B (1,1) | B=C (1,1) | C=A (1,1) | A,B,C (1,1,1) | A,B,C (1,1,1) |
| | | C < A (0,1) | * | * |
| | | C > A (1,0) | * | * |
| | B < C (0,1) | C=A (1,1) | * | * |
| | | C < A (0,1) | * | * |
| | | C > A (1,0) | C (0,0,1) | A AND B (1,1,0) |
| | B > C (1,0) | C=A (1,1) | * | * |
| | | C < A (0,1) | A AND B (1,1,0) | C (0,0,1) |
| | | C > A (1,0) | * | * |
| A < B (0,1) | B=C (1,1) | C=A (1,1) | * | * |
| | | C < A (0,1) | * | * |
| | | C > A (1,0) | B AND C (0,1,1) | A (1,0,0) |
| | B < C (0,1) | C=A (1,1) | * | * |
| | | C < A (0,1) | * | * |
| | | C > A (1,0) | C (0,0,1) | A (1,0,0) |
| | B > C (1,0) | C=A (1,1) | B (0,1,0) | A AND C (1,0,1) |
| | | C < A (0,1) | B (0,1,0) | C (0,0,1) |
| | | C > A (1,0) | B (0,1,0) | A (1,0,0) |
| A > B (1,0) | B=C (1,1) | C=A (1,1) | * | * |
| | | C < A (0,1) | A (1,0,0) | B AND C (0,1,1) |
| | | C > A (1,0) | * | * |
| | B < C (0,1) | C=A (1,1) | A AND C (1,0,1) | B (0,1,0) |
| | | C < A (0,1) | A (1,0,0) | B (0,1,0) |
| | | C > A (1,0) | C (0,0,1) | B (0,1,0) |
| | B > C (1,0) | C=A (1,1) | * | * |
| | | C < A (0,1) | A (1,0,0) | C (0,0,1) |
| | | C > A (1,0) | * | * |

* : IMPOSSIBLE COMBINATION

FIG. 4

CIRCUIT FOR COMPARING A PLURALITY OF BINARY INPUTS

BACKGROUND OF THE INVENTION

The present invention relates to a circuit for comparing M ($M \geq 3$) binary numbers.

A conventional circuit for comparing binary inputs compares two numbers. A comparison of two numbers is generally performed by calculating a difference between the two numbers to obtain a relation therebetween. More specifically, assuming that two numbers are A and B, if a difference $(A-B)$ is positive, the relation is $A>B$; if the difference is negative, it is $A<B$; and if the difference is 0, it is $A=B$. This will be described in more detail below with regard to a comparison of two floating-point data with reference to FIG. 1. Referring to FIG. 1, assume that the two floating-point data are A and B, their exponential parts are $A_e$ and $B_e$, and their mantissa parts are $A_m$ and $B_m$, respectively. The exponential parts $A_e$ and $B_e$ are supplied to an exponential part calculator 411 to calculate an absolute value $|A_e - B_e|$ of a difference between the exponential parts $A_e$ and $B_e$ and a magnitude relation therebetween. The calculation result is supplied as shift information C to a decoder 421. In order to shift the digits of the mantissa part corresponding to a smaller exponential part to correspond to the digits of the mantissa part corresponding to a larger exponential part, the decoder 421 generates and outputs shift amounts $D_0$ and $D_1$ of the mantissa parts $A_m$ and $B_m$, respectively. Shifters 422 and 423 receive the mantissa parts $A_m$ and $B_m$ and the shift amounts $D_0$ and $D_1$, respectively, and shift the digits to correspond to each other, and output the results to a subtractor 431. The subtractor 431 performs mantissa part calculation of the floating-point data, and generates and outputs a difference F between the mantissa parts. A judging circuit 441 receives the difference F between the mantissa parts, and generates and outputs a signal G representing a magnitude relation between the numers A and B in accordance with a sign part and parts other than the sign part of the difference F.

A conventional two-input comparator not using a subtractor operates as follows. That is, assuming that two n-bit positive binary numbers (n is an arbitrary natural number) are $A=[a_0, a_1, a_2, \ldots, a_{n-1}]$ and $B=[b_0, b_1, b_2, \ldots, b_{n-1}]$, and that S and T are given by logic equations:

$$S = a_0 \cdot \bar{b}_0 + (a_0 \odot b_0) \cdot a_1 \cdot \bar{b}_1 + (a_0 \odot b_0) \cdot (a_1 \odot b_1) \cdot a_2 \cdot \bar{b}_2 + \ldots + (a_0 \odot b_0) \ldots (a_{n-2} \odot b_{n-2}) \cdot a_{n-1} \cdot \bar{b}_{n-1} + (a_0 \odot b_0) \ldots (a_{n-1} \odot b_{n-1})$$

$$T = \bar{a}_0 \cdot b_0 + (a_0 \odot b_0) \cdot \bar{a}_1 \cdot b_1 + (a_0 \odot b_0) \cdot (a_1 \odot b_1) \cdot \bar{a}_2 \cdot b_2 + \ldots + (a_0 \odot b_0) \ldots (a_{n-2} \odot b_{n-2}) \cdot \bar{a}_{n-1} \cdot b_{n-1} + (a_0 \odot b_0) \ldots (a_{n-1} \odot b_{n-1})$$

where $\odot$ is an exclusive NOR, the conventional two-input comparator generates and outputs S, T such that if $(S, T)=(1, 0)$, $A>B$, if $(S, T)=(0, 1)$, $A<B$, and if $(S, T)=(1,1)$, $A=B$.

In the above conventional comparator, however, only two numbers can be compared. Therefore, for example, in order to calculate a minimum value in a set having a large number of elements, calculations must be repeatedly performed until a final result is obtained, resulting in a time-consuming operation. In addition, a number of storage means must be used to hold data.

SUMMARY OF THE INVENTION

It is, therefore, an object of the present invention to provide a circuit for comparing a plurality of binary inputs, which can reduce calculation time with a small number of hardware elements.

In order to achieve the above object of the present invention, a circuit for comparing a plurality of binary inputs, comprises a means for generating and outputting a signal representing which of M ($M \geq 3$) binary numbers is maximum or minimum.

BRIEF DESCRIPTION OF THE DRAWINGS

FIG. 4 is a view showing an algorithm of a judging circuit in FIG. 3;

DETAILED DESCRIPTION OF THE PREFERRED EMBODIMENTS

Embodiments of the present invention will be described below.

In the following embodiments, the number M of binary inputs is three.

Figure 1:
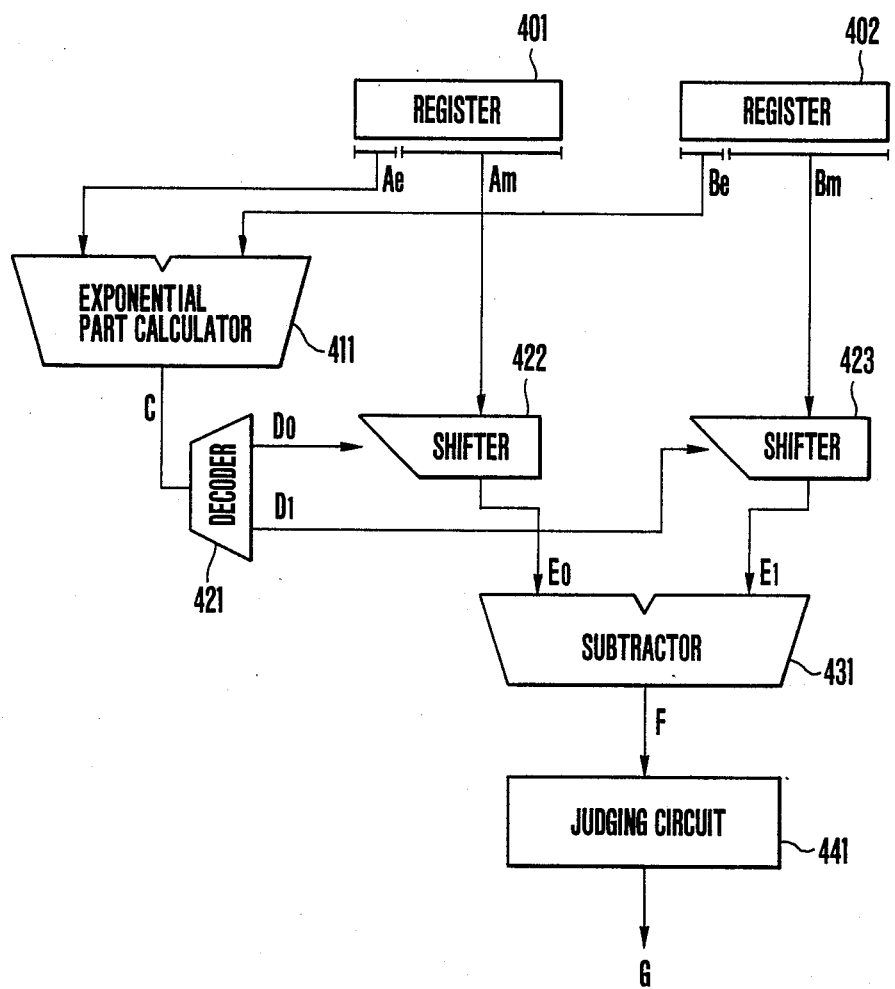
FIG. 1 is a block diagram showing a conventional technique.
Figure 2:
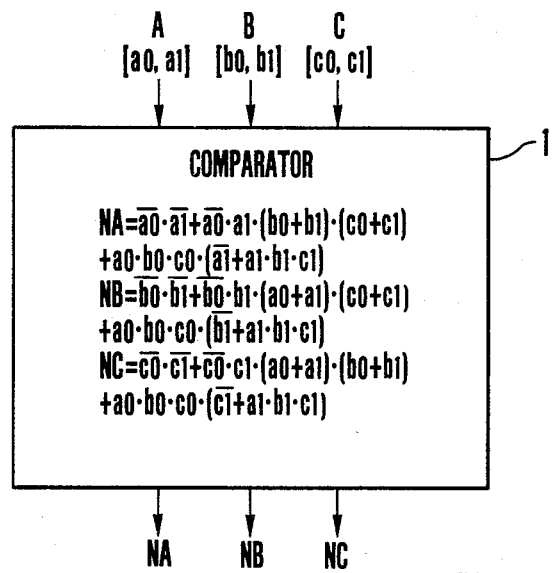
FIG. 2 is a block diagram showing an arrangement of an embodiment of the present invention.

FIG. 2 shows an embodiment of the present invention. Referring to FIG. 2, assuming that three two-bit positive binary numbers are $A=[a_0, a_1]$, $B=[b_0, b_1]$ and $C=[c_0, c_1]$, a comparator 1 generates signals NA, NB, NC representing which of the binary numbers A, B, and C is minimum such that if (NA, NB, NC)=(0, 0, 1), $C<A, B$,
if (NA, NB, NC)=(0, 1, 0), $B<A, C$,
if (NA, NB, NC)=(0, 1, 1), $B=C<A$,
if (NA, NB, NC)=(1, 0, 0), $A<B, C$,
if (NA, NB, NC)=(1, 0, 1), $A=C<B$,
if (NA, NB, NC)=(1, 1, 0), $A=B<C$, and
if (NA, NB, NC)=(1, 1, 1), $A=B=C$.

N-bit positive binary number $D=[d_0, d_1, d_2, \ldots, d_{n-1}]$ is generally $d_0 \cdot 2^{n-1} + d_1 \cdot 2^{n-2} + \ldots + d_{n-1} \cdot 2^0$. Therefore, higher order bits have a more significant effect on the magnitude relation between the numbers. For this reason, in this embodiment, attention is first paid to the highest order bits $a_0$, $b_0$ and $c_0$. If only one of the bits $a_0$, $b_0$ and $c_0$ is "0" and the remaining two bits are "1"s, a signal representing the number having the 0 bit is rendered to be "1". If two of the bits $a_0$, $b_0$, and $c_0$ are "0"s, attention is paid to the lower order bits $a_1$, $b_1$, $c_1$ to judge the magnitude relation. Therefore, the values of the signal NA, NB, NC is represented by logical equations:

$$NA = \bar{a}_0 \cdot \bar{a}_1 + \bar{a}_0 \cdot a_1 \cdot (b_0 + b_1) \cdot (c_0 + c_1) + a_0 \cdot b_0 \cdot c_0 \cdot (\bar{a} + a_1 \cdot b_1 \cdot c_1)$$

$$NB = \bar{b}_0 \cdot \bar{b}_1 + \bar{b}_0 \cdot b_1 \cdot (a_0 + a_1) \cdot (c_0 + c_1) + a_0 \cdot b_0 \cdot c_0 \cdot (\bar{b} + a_1 \cdot b_1 \cdot c_1)$$

$$NC = \overline{c_0} \cdot \overline{c_1} + \overline{c_0} \cdot c_1 \cdot (a_0 + a_1) \cdot (b_0 + b_1) + a_0 \cdot b_0 \cdot c_0 \cdot (\overline{c_1} + a_1 \cdot b_1 \cdot c_1)$$

The comparator 1 shown in FIG. 2 is constituted to output the signals NA, NB, NC.

Figure 3:
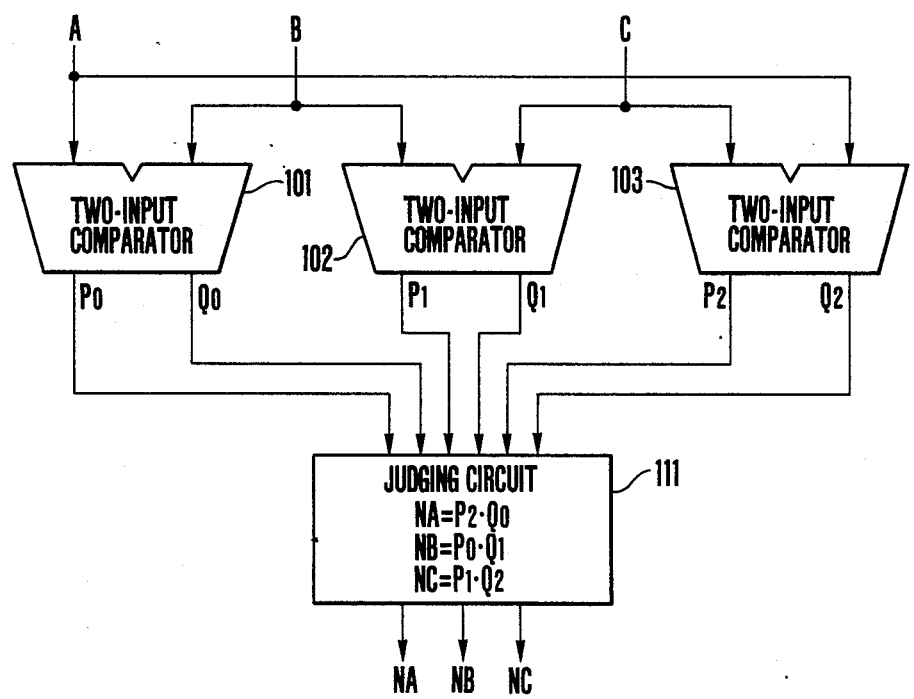
FIG. 3 is a block diagram showing an arrangement of another embodiment of the present invention.

FIG. 3 shows another embodiment of the present invention. A circuit shown in FIG. 3 compares three combinations A and B, B and C, and C and A obtained by extracting two out of three binary numers A, B and C by two-input comparators 101, 102 and 103 and generates signals NA, NB, NC representing which of the three combinations is minimum in accordance with the comparison results.

Referring to FIG. 3, a two-input comparator 101 receives the binary numbers A and B, and generates and outputs $(P_0, Q_0) = (0, 1)$ if $A < B$, $(P_0, Q_0) = (1, 0)$ if $A > B$, and $(P_0, Q_0) = (1, 1)$ if $A = B$. Similarly, a two-input comparator 102 receives the binary numbers B and C, and generates and outputs $(P_1, Q_1) = (0, 1)$ if $B < C$, $(P_1, Q_1) = (1, 0)$ if $B > C$, and $(P_1, Q_1) = (1, 1)$ if $B = C$. Similarly, a two-input comparator 103 receives the binary numbers C and A, and generates and outputs $(P_2, Q_2) = (0, 1)$ if $C < A$, $(P_2, Q_2) = (1, 0)$ if $C > A$, and $(P_2, Q_2) = (1, 1)$ if $C = A$. The comparison results $P_0, Q_0, P_1, Q_1$ and $P_2, Q_2$ of the three combinations are supplied to a judging circuit 111. The judging circuit 111 is designed to generate the signals NA, NB, NC which represent a minimum value of the binary numbers A, B and C as follows.

The logic of the judging circuit 111 will be described in detail below with reference to FIG. 4. $P_i, Q_i (i=0, 1, 2)$ is represented by 27 combinations except for $(P_i, Q_i) = (0, 0)$, as shown in FIG. 4. In this case, if a comparison result of the binary numbers A and B is $A = B$ ($(P_0, Q_0) = (1, 1)$) and that of the binary numbers B and C is $B = C$ ($(P_1, Q_1) = (1,1)$), a relation of $A = B = C$ is established. If, however, a comparison result of another combination of the binary numbers of C and A is $C < A$ ($(P_2, Q_2) = (0, 1)$), $C \neq A$ and $A = B = C$ simultaneously exist. This means that a logic impossible in an ordered set is present. Therefore, as shown in FIG. 4, by representing such impossible combinations by symbols "*", 13 possible combinations are obtained. From these possible combinations, the following logic equations are obtained:

$$NA = P_2 \cdot Q_0$$

$$NB = P_0 \cdot Q_1$$

$$NC = P_1 \cdot Q_2$$

The judging circuit 111 generates and outputs the signals NA, NB, NC representing a minimum value of the three input binary numbers A, B and C represented by the above equations.

Figure 5:
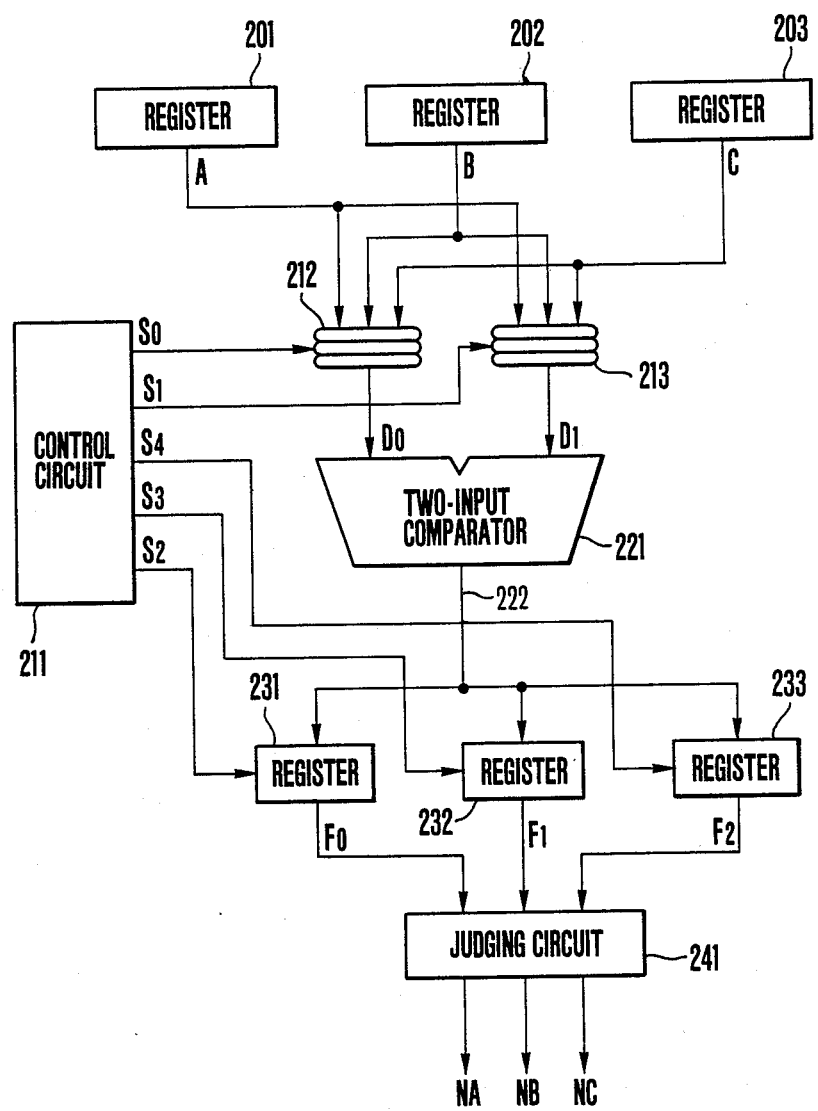
FIG. 5 is a block diagram showing an arrangement of still another embodiment of the present invention.

FIG. 5 shows still another embodiment of the present invention. A circuit shown in FIG. 5 employs only one two-input comparator.

Referring to FIG. 5, registers 201, 202 and 203 hold three binary numbers A, B and C. In accordance with control signals $S_0$ and $S_1$ generated by a control circuit 211, selectors 212 and 213 select the binary number A (register 201) and the binary number B (register 202), respectively, and supply the binary numbers A and B to a two-input comparator 221. The two-input comparator 221 generates and outputs a comparison result signal 222 representing a comparison result $F_0$ of the binary numbers A and B. The comparison result $F_0$ is held in a register 231 by a set signal $S_2$ generated by the control circuit 211 until the next set signal is supplied.

In accordance with the control signals $S_0$ and $S_1$ generated by the control circuit 211, the selectors 212 and 213 select the binary numbers B and C from the binary numbers A, B and C held in the registers 201, 202 and 203, respectively, and supply the binary numbers B and C to the two-input comparator 221. The two-input comparator 221 generates and outputs the comparison result signal 222 representing a comparison result $F_1$ of the binary numbers B and C. The comparison result $F_1$ is held in a register 232 by a set signal $S_3$ generated by the control circuit 211 until the next set signal is supplied.

In accordance with the control signals $S_0$ and $S_1$ generated by the control circuit 211, the selectors 212 and 213 select the binary numbers C and A from the binary numbers A, B and C held in the registers 201, 202 and 203, respectively, and supply the binary numbers C and A to the two-input comparator 221. The two-input comparator 221 generates and outputs the comparison result signal 222 representing a comparison result $F_2$ of the binary numbers C and A. The comparison result $F_2$ is held in a register 233 by a set signal $S_4$ generated by the control circuit 211 until the next set signal is supplied.

Comparison results $F_0, F_1$ and $F_2$ of the binary number combinations A and B, B and C, and C and A held in the registers 231, 232, and 233, respectively, are supplied to a judging circuit 241 capable of realizing the logic described in the second embodiment. The judging circuit 241 generates and outputs signals NA, NB and NC representing a minimum value of the three binary numbers A, B and C.

In the above embodiments, the description has been made in the case of $M = 3$. The present invention, however, can be similarly applied when $M > 3$.

Figure 6:
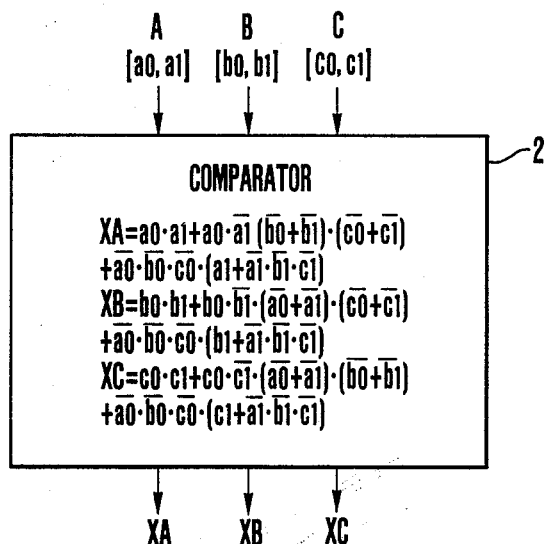
FIG. 6 is a block diagram showing an arrangement of still another embodiment of the present invention.

FIG. 6 shows still another embodiment of the present invention. Referring to FIG. 6, assuming that three two-bit positive binary numbers are $A = [a_0, a_1]$, $B = [b_0, b_1]$ and $C = [c_0, c_1]$, a comparator 2 generates signals XA, XB, XC representing a maximum value of the three binary numbers A, B and C such that if $(XA, XB, XC) = (0, 0, 1)$, $A, B < C$,
if $(XA, XB, XC) = (0, 1, 0)$, $A, C < B$,
if $(XA, XB, XC) = (0, 1, 1)$, $A < B = C$,
if $(XA, XB, XC) = (1, 0, 0)$, $B, C < A$,
if $(XA, XB, XC) = (1, 0, 1)$, $B < A = C$,
if $(XA, XB, XC) = (1, 1, 0)$, $C < A = B$, and
if $(XA, XB, XC) = (1, 1, 1)$, $A = B = C$.

As described above, in an n-bit positive binary number, higher order bits have a more significant effect on the magnitude relation. Therefore, attention is first paid to the highest order bits $a_0, b_0$ and $c_0$. If only one of the bits $a_0, b_0$ and $c_0$ is "1" and the remaining two bits are "0"s, a signal representing the number having the "1" bit is rendered to be "1". If two of the bits $a_0, b_0$ and $c_0$ are "1"s, attention is paid to the lower order bits $a_1, b_1, c_1$ to judge the magnitude relation. Therefore, comparator 2 shown in FIG. 6 can be realized by arranging a circuit in which XA, XB and XC are represented by logic equations:

$$XA = a_0 \cdot a_1 + a_0 \cdot \overline{a_1}(\overline{b_0} + \overline{b_1}) \cdot (\overline{c_0} + \overline{c_1}) + \overline{a_0} \cdot \overline{b_0} \cdot \overline{c_0} \cdot (a_1 + \overline{a_1} \cdot \overline{b_1} \cdot \overline{c_1})$$

$$XB = b_0 \cdot b_1 + b_0 \cdot \overline{b}_1 (\overline{a}_0 + \overline{a}_1) \cdot (c_0 + \overline{c}_1) + \overline{a}_0 \cdot \overline{b}_0 \cdot c_0 \cdot (b_1 + a_1 \cdot \overline{b}_1 \cdot c_1)$$

$$XC = c_0 \cdot c_1 + c_0 \cdot \overline{c}_1 (\overline{a}_0 + \overline{a}_1) \cdot (\overline{b}_0 + \overline{b}_1) + \overline{a}_0 \cdot \overline{b}_0 \cdot c_0 \cdot (c_1 + \overline{a}_1 \cdot \overline{b}_1 \cdot c_1)$$

Figure 7:
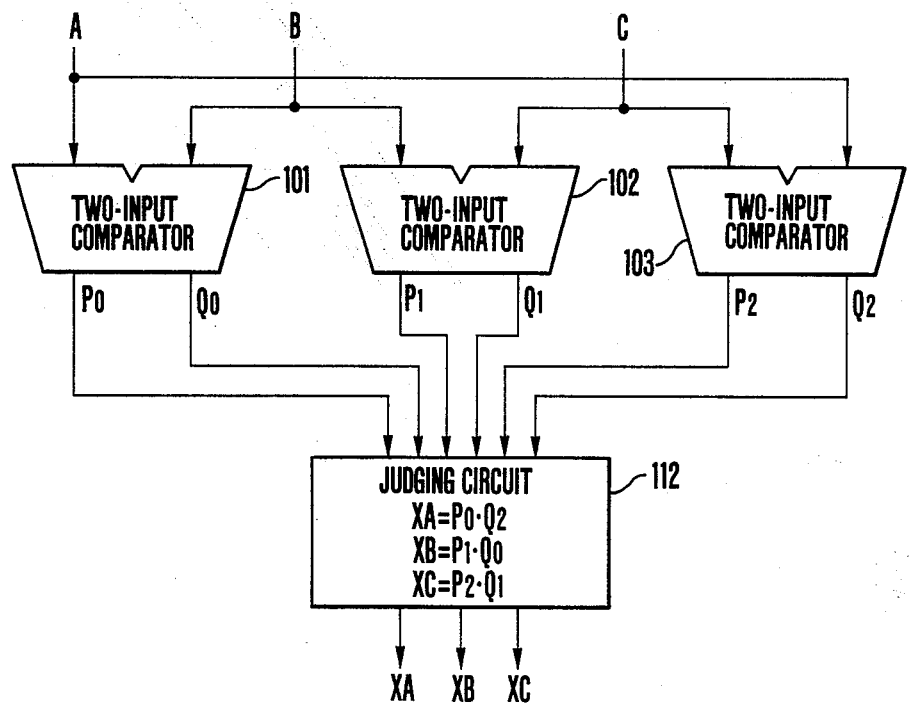
FIG. 7 is a block diagram showing an arrangement of still another embodiment of the present invention.

FIG. 7 shows still another embodiment of the present invention. In FIG. 7, since the same reference numerals as in FIG. 3 denote the same parts and $(P_0, Q_0)$, $(P_1, Q_1)$ and $(P_2, Q_2)$ are shown in FIG. 4, a detailed description thereof will not be repeated.

From 13 possible combinations shown in FIG. 4, the following logic equations are obtained:

$$XA = P_0 \cdot Q_2$$

$$XB = P_1 \cdot Q_0$$

$$XC = P_2 \cdot Q_1$$

That is, the judging circuit 112 receives three binary numbers A, B and C, and generates and outputs signals XA, XB, XC representing a maximum value of the inputs.

As a modification of the embodiment shown in FIG. 7, the arrangement of the embodiment shown in FIG. 5 can be adopted. However, a detailed description of this modification will not be repeated.

As has been described above, according to the present invention, M numbers can be simultaneously compared with each other. Therefore, the comparing circuit according to the present invention can compare M numbers by only one calculation, while a conventional two-input comparator performs calculations a plurality of times. In addition, a maximum or minimum value in a large number of values can be specified at high speed. Also, since the calculation time is shortened, no hardware need be used to store numerals during calculation, and control circuitry is simplified. As a result, the number of hardware elements is decreased as a whole. Therefore, when the present invention is reaized in an LSI or the like, the number or the like of LSIs can be decreased to realize a suitable LSI arrangement.

What is claimed is:

1. A comparator for receiving M numbers, where M is greater than or equal to three and for generating a signal indicating which of said M numbers are minimum, said comparator comprising:
   a plurality of two-input comparators each receiving two of said M numbers $A_1, A_2, \ldots, A_M$, and generating and outputting a signal representing a relation between different numbers $A_i$ and $A_j$, where $i \neq j$; and
   a judging circuit receiving outputs from all of said two-input comparators, and generating and outputting a signal representing which of said M numbers $A_1, A_2, \ldots, A_M$ is minimum.

2. A comparator for receiving numbers A, B, and C and for generating a signal indicating which of A, B, and C are minimum, said comparator comprising:
   a first two-input comparator generating and outputting signals $P_0$ and $Q_0$ representing a relation between numbers A and B such that $(P_0, Q_0) = (1, 0)$ if $A > B$, $(P_0, Q_0) = (0, 1)$ if $A < B$, and $(P_0, Q_0) = (1, 1)$ if $A = B$;
   a second two-input comparator generating and outputting signals $P_1$ and $Q_1$ representing a relation between numbers B and C such that $(P_1, Q_1) = (1, 0)$ if $B > C$, $(P_1, Q_1) = (0, 1)$ if $B < C$, and $(P_1, Q_1) = (1, 1)$ if $B = C$;
   a third two-input comparator generating and outputting signals $P_2$ and $Q_2$ representing a relation between numbers C and A such that $(P_2, Q_2) = (1, 0)$ if $C > A$, $(P_2, Q_2) = (0, 1)$ if $C < A$, and $(P_2, Q_2) = (1, 1)$ if $C = A$; and
   a judging circuit receiving signals $P_0$ and $Q_0$; $P_1$ and $Q_1$ and $P_2$ and $Q_2$, and generating and outputting signals NA, NB, and NC representing which of numbers A, B and C are minimum such that
   if C is minimum ($C < A, B$), then (NA, NB, NC) = (0, 0, 1),
   if B is minimum ($B < A, C$), then (NA, NB, NC) = (0, 1, 0),
   if B and C are minimum ($B = C < A$), then (NA, NB, NC) = (0, 1, 1),
   if A is minimum ($A < B, C$), then (NA, NB, NC) = (1, 0, 0),
   if A and C are minimum ($A = C < B$), then (NA, NB, NC) = (1, 0, 1),
   if A and B are minimum ($A = B < C$), then (NA, NB, NC) = (1, 1, 0), and
   if A, B and C are equal ($A = B = C$), then (NA, NB, NC) = (1, 1, 1)
   in accordance with logic equations:
   $NA = P_2 \cdot Q_0$
   $NB = P_0 \cdot Q_1$
   $NC = P_1 \cdot Q_2$.

3. A comparator for receiving M numbers, where M is greater than or equal to three and for generating a signal indicating which of said M numbers are minimum, said comparator comprising:
   M input registers holding M numbers $A_1, A_2, \ldots, A_M$;
   selectors sequentially selecting outputs $A_i$ and $A_j$, where $i \neq j$, from two different input registers in accordance with a selection signal;
   a two-input comparator receiving numbers $A_i$ and $A_j$ selected by said selectors, and generating and outputting a comparison result signal representing a relation between numbers $A_i$ and $A_j$;
   result registers each receiving a comparison result signal from said two-input comparator together with a set signal and holding said comparison result signal until a next set signal is supplied to said result registers;
   a control circuit generating and outputting said selection signal and said set signal; and
   a judging circuit receiving outputs from said result registers, and generating and outputting a signal indicating which of said M numbers $A_1, A_2, \ldots, A_M$ is minimum.

4. A comparator for receiving M numbers, where M is greater than or equal to three, and for generating a signal indicating which of said M numbers are maximum, said comparator comprising:
   a plurality of two-input comparators each receiving two of said M numbers $A_1, A_2, \ldots, A_M$, and generating and outputting a signal representing a relation between different numbers $A_i$ and $A_j$, where $i \neq j$; and
   a judging circuit receiving outputs from all of said two-input comparators, and generating and outputting a signal representing which of said M numbers $A_1, A_2, \ldots, A_M$ is maximum.

5. A comparator for receiving numbers A, B, and C and for generating a signal indicating which of A, B, and C are maximum, said comparator comprising:

a first two-input comparator generating and outputting signals $P_0$ and $Q_0$ representing a relation between numbers A and B such that $(P_0, Q_0) = (1, 0)$ if $A > B$, $(P_0, Q_0) = (0, 1)$ if $A < B$, and $(P_0, Q_0) = (1, 1)$ if $A = B$;

a second two-input comparator generating and outputting signals $P_1$ and $Q_1$ representing a relation between numbers B and C such that $(P_1, Q_1) = (1, 0)$ if $B > C$, $(P_1, Q_1) = (0, 1)$ if $B < C$, and $(P_1, Q_1) = (1, 1)$ if $B = C$;

a third two-input comparator generating and outputting signals $P_2$ and $Q_2$ representing a relation between numbers C and A such that $(P_2, Q_2) = (1, 0)$ if $C > A$, $(P_2, Q_2) = (0, 1)$ if $C < A$, and $(P_2, Q_2) = (1, 1)$ if $C = A$; and a judging circuit receiving signals $P_0$ and $Q_0$; $P_1$ and $Q_1$ and $P_2$ and $Q_2$ and generating and outputting signals XA, XB, and XC representing which of numbers A, B and C are maximum such that if C is maximum (A, B < C), then (XA, XB, XC) = (0, 0, 1), if B is maximum (A, C < B), then (XA, XB, XC) = (0, 1, 0), if B and C are maximum (A < B = C), then (XA, XB, XC) = (0, 1, 1), if A is maximum (B, C < A), then (XA, XB, XC) = (1, 0, 0), if A and C are maximum (B < A = C), then (XA, XB, XC) = (1, 0, 1), if A and B are maximum (C < A = B), then (XA, XB, XC) = (1, 1, 0), and if A, B and C are equal (A = B = C), then (XA, XB, XC) = (1, 1, 1)

in accordance with logic equations:

$XA = P_0 \cdot Q_2$
$XB = P_1 \cdot Q_0$
$XC = P_2 \cdot Q_1$.

6. A comparator for receiving M numbers, where M is greater than or equal to three, and for generating a signal indicating which of said M numbers are maximum, said comparator comprising:

M input registers holding M numbers $A_1, A_2, \ldots, A_M$;

selectors sequentially selecting outputs $A_i$ and $A_j$, where $i \neq j$, from two different input registers in accordance with a selection signal;

a two-input comparator receiving numbers $A_i$ and $A_j$ selected by said selectors, and generating and outputting a comparison result signal representing a relation between numbers $A_i$ and $A_j$;

result registers each receiving a comparison result signal from said two-input comparator together with a set signal and holding said comparison result signal until a next set signal is supplied to said result registers;

a control circuit generating and outputting said selection signal and said set signal; and a judging circuit receiving outputs from said result registers, and generating and outputting a signal indicating which of said M numbers $A_1, A_2, \ldots, A_M$ is maximum.

7. A method for comparing electrical signals representing three or more numbers comprising the steps of:

receiving said electrical signals in a plurality of comparators, all of said electrical signals being received in said plurality of comparators at essentially the same time;

comparing subsets of said electrical signals to determine magnitude relationships between subsets of said electrical signals, all of said comparing being performed at essentially the same time, each subset corresponding to one of said three or more numbers;

outputting comparison result signals indicative of said magnitude relationships to a logic circuit; and receiving said comparison result signals in said logic circuit, and generating output signals identifying one of a maximum and a minimum of said three or more numbers based on a logical combination of said comparison of said comparison result signals.

* * * * *